United States Patent Office 3,220,090
Patented Nov. 30, 1965

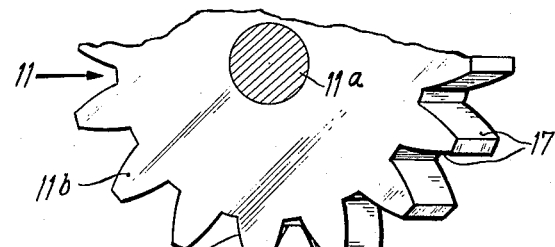
Fig. 1
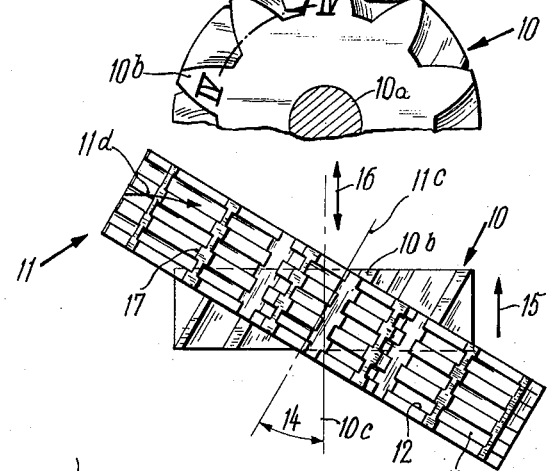
Fig. 2
Fig. 4
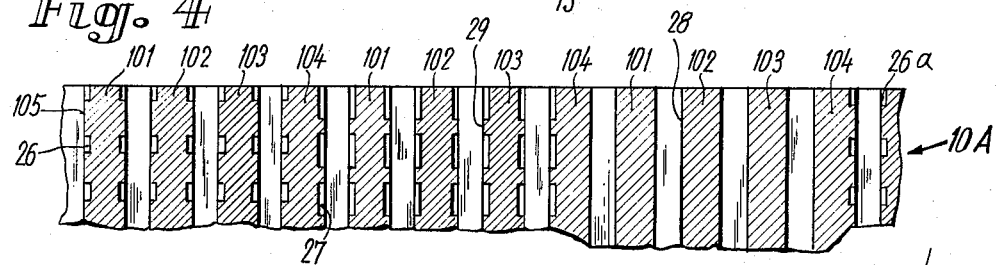
Fig. 3
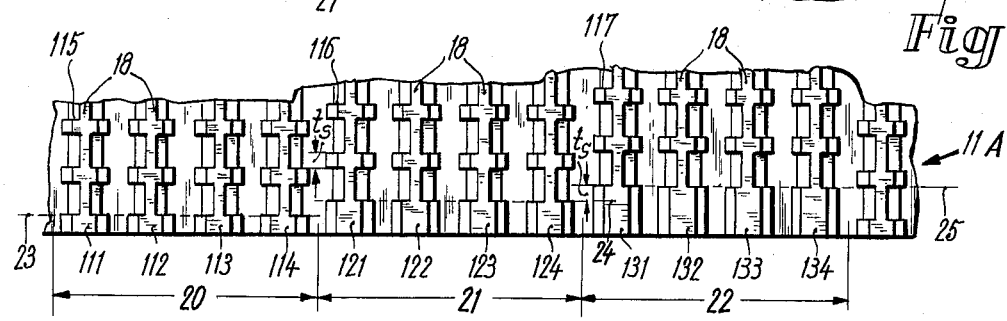
INVENTOR
FRITZ HURTH
BY Michael S. Striker
his ATTORNEY

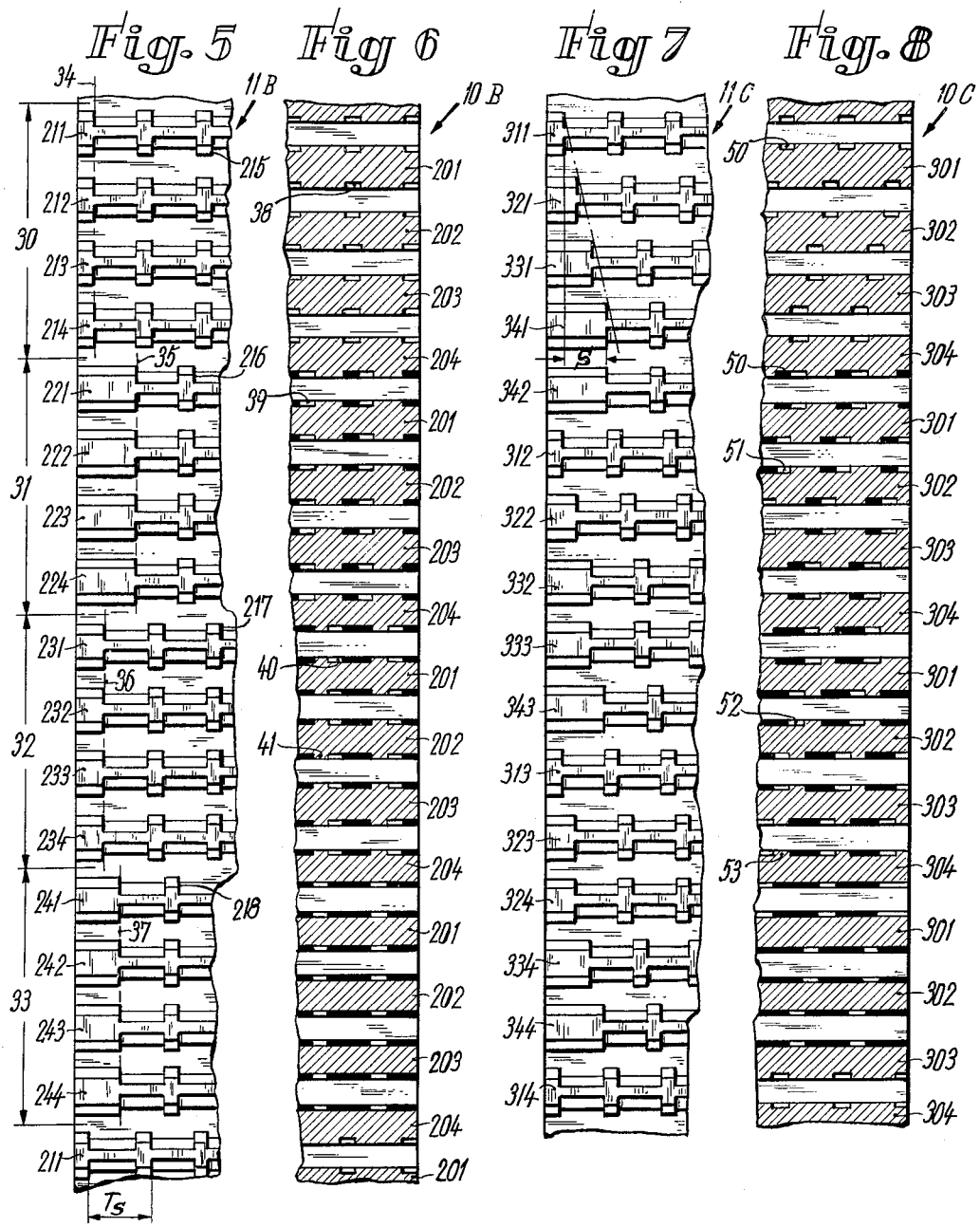

3,220,090
SHAVING CUTTER
Fritz Hurth, Grunwald, near Munich, Germany, assignor to Carl Hurth-Maschinen- und Zahnradfabrik, Munich, Germany
Filed Dec. 17, 1963, Ser. No. 331,260
Claims priority, application Germany, Dec. 21, 1962, H 47,784
16 Claims. (Cl. 29—103)

The present invention relates to apparatus for treating gears and similar toothed workpieces, and more particularly to a rotary cutter which removes shavings from the flanks on the teeth of such workpieces. Still more particularly, the invention relates to a rotary gear-shaped cutter which is especially suited for shaving of toothed workpieces by the crossed axes method.

It is an important object of my invention to provide a rotary cutter of the above outlined characteristics which is capable of removing shavings without the formation of zebra stripes and similar inaccuracies and which may be utilized for treatment of many types of workpieces.

Another important object of the invention is to provide a rotary cutter which may be used for removal of shavings from large, medium-sized and/or small workpieces as long as the number of teeth on a workpiece is properly related to the number of teeth on the cutter so that a gear shaving, burnishing or grinding machine may be furnished with a limited number of cutters which will be capable of treating all or nearly all types of toothed workpieces.

A further object of the invention is to provide a rotary cutter of the above outlined characteristics which is capable of completing the treatment of a workpiece within exceptionally short periods of time and which is capable of treating a workpiece even though it merely rotates but does not move axially with reference to the workpiece or vice versa.

A concomitant object of the invention is to provide a rotary cutter which is especially suited for treating of workpieces in a mass-producing plant wherein a large number of gears, racks, pinions and other types of workpieces must be treated and otherwise processed on a large scale, and wherein the removal of shavings should be completed at the same speed as the operations which precede and/or which follow a shaving, burnishing or grinding step.

With the above objects in view, one feature of my invention resides in the provision of a rotary cutter for removal of shavings from toothed workpieces by the crossed axes method. The cutter comprises teeth forming a plurality of groups in each of which the number of teeth is a whole multiple of the number of teeth on the workpiece to be treated, i.e., the number of teeth in any given group is one, two, three or more times the number of teeth on the workpiece so that the cutter may be used for shaving, burnishing or grinding of workpieces whereon the number of teeth equals, is one-half, one-third etc. of the number of teeth in any given group. Each tooth of the cutter has flanks provided with grooves which form cutting edges extending in a direction substantially from the root to the land of the respective tooth and preferably disposed in planes which are perpendicular to the axis of the cutter. The cutting edges of teeth in each group are preferably disposed in common planes but are staggered axially with reference to the cutting edges in each other group.

As a rule, the cutter will be provided with at least three groups of teeth and each cutting edge of any given group preferably forms a helix with one cutting edge of each other group. The lead of each helix is a whole multiple of the distance between two adjacent cutting edges on a flank of any given tooth so that such cutting edges will treat all zones of the flanks on the teeth of a workpiece when the latter is brought into mesh with the revolving cutter.

The novel features which are considered as characteristic of the invention are set forth in particular in the appended claims. The improved cutter itself, however, both as to its construction and the method of using the same, together with additional features and advantages thereof, will be best understood from the following detailed description of certain specific embodiments with reference to the accompanying drawings, in which:

FIG. 1 is a fragmentary front elevational view of a workpiece in mesh with a shaving cutter embodying one form of the invention;

FIG. 2 is a top plan view of the structure shown in FIG. 1;

FIG. 3 is a schematic developed view of a shaving cutter;

FIG. 4 illustrates developments of multiple rotations of a toothed workpiece which may be shaved with the cutter of FIG. 3;

FIG. 5 is a schematic developed view of a modified shaving cutter;

FIG. 6 illustrates developments of multiple rotations of a toothed workpiece which may be shaved with the cutter of FIG. 5;

FIG. 7 is a schematic developed view of a further shaving cutter; and

FIG. 8 illustrates developments of multiple rotations of a toothed workpiece which may be shaved with the cutter of FIG. 7.

Referring to FIGS. 1 and 2, there is shown a portion of a machine for shaving gears 10 and other types of toothed workpieces. The machine comprises a work holder including a spindle 10a which supports the workpiece 10 and a tool holder including a spindle 11a which supports a rotary cutter 11. This cutter is produced and configurated in accordance with the present invention, and the number of its teeth 11b is at least twice, or a higher whole multiple of, the number of teeth 10b on the workpiece 10.

Each tooth 11b has two flanks 17 provided with a plurality of grooves 13 which define cutting edges 12 extending in a direction from the root to the land of the respective tooth and located in planes which are perpendicular to the axis 11c of the cutter. This axis coincides with the axis of the tool spindle 11a, and it will be noted that the axis 11c crosses in space the axis 10c of the work spindle 10a. The projection of the axis 11c into the plane of FIG. 2 encloses with the axis 10c an acute angle 14. The direction in which the cutter 11 rotates is indicated by an arrow 11d and, during such rotation, the cutting edges 12 perform a movement having a component in the axial direction of the workpiece 10 (arrow 15) whereby the cutting edges 12 remove shavings to grind, burnish or shave the flanks on the teeth 10b of the workpiece.

In the embodiment of FIGS. 1 and 2, the cutter 11 resembles a spur gear having two end faces disposed in planes which are parallel to the planes of the cutting edges 12.

If the number of cutting edges 12 on a given tooth flank and/or the number of teeth on the cutter 11 is small, and/or if the axial length of the cutter is small in comparison with the axial length of the teeth on the workpiece 10, one of these parts is reciprocated in the axial direction of the workpiece (arrow 16). On the other hand, if the angle 14 is large, if the axial length of the cutter 11 at least approximates the axial length of the workpiece, and if each flank 17 is provided with a large number of closely adjacent cutting edges 12, axial movements in the direction of arrow 16 may be dispensed with. As a rule, the teeth 11b are provided with cutting edges which are staggered with reference to the cutting edges on certain other teeth of the cutter 11 in such a way that the projections of such staggered cutting edges into a common plane passing through the axis 11c are spaced from each other in the axial direction of the cutter.

The cutter 11 need not move in directions indicated by the arrow 16 if the cutting edges 12 are distributed in such a way that, in the absence of a movement axially of the workpiece 10, the cutter will be able to shave the entire flanks of teeth on the workpiece.

FIG. 3 is a developed view of a shaving cutter 11A wherein the lands of the teeth 111–114, 121–124 and 131–134 are identified by reference numerals 18. These teeth form three groups 20 (teeth 111–114), 21 (teeth 121–124) and 22 (teeth 131–134). The teeth 111–114 of the first group 20 are provided with coplanar cutting edges 115, and the teeth 121–124, 131–134 in the groups 21, 22 are respectively provided with cutting edges 116, 117. The shortest distance $t_s$ between the plane of a cutting edge 115 or 116 and the plane of the nearest cutting edge 116 or 117 equals one-third of the shortest distance between the planes of two adjacent cutting edges 115, 116 or 117. It is not always necessary that the cutting edges be disposed in planes which are perpendicular to the axis of the cutter 11A as long as such cutting edges extend in the general direction from the roots to the lands 18 of the respective teeth. For example, the cutting edges on a given tooth flank may converge in a direction toward the root or the land of the respective tooth.

The cutter 11A is utilized for shaving of a gear-shaped workpiece 10A which is shown in FIG. 4. For the sake of simplicity, this workpiece is assumed to have four teeth 101–104. FIG. 4 shows these teeth in three consecutive stages of treatment, namely, in a first stage after the teeth 101–104 were in mesh with the teeth 111–114 of the first group 20 (first revolution of the workpiece 10A), in a second stage after the teeth 101–104 were brought into mesh with the teeth 121–124 of the second group 21 (second revolution of the workpiece 10A), and in a third stage after the teeth 101–104 were brought into mesh with the teeth 131–134 of the group 22 (third revolution of the workpiece 10A). In the first stage, the cutting edges 115 remove shavings from the tooth flanks 105 to form grooves 26. In the second stage, the cutting edges 116 remove shavings to form grooves 27 which are immediately adjacent to the grooves 26 so that each pair of grooves 26, 27 forms a rather wide groove which is separated from the next pair of such grooves by a rib 29. The ribs 29 are removed by the cutting edges 117 so that, after the third revolution of the workpiece 10A, each of its flanks has a surface 28 which is shaved from the one to the other axial end of the workpiece. The shaving operation begins anew during the fourth revolution of the workpiece whereby the cutting edges 115 will form in each of the partially treated surfaces 28 a series of grooves 26a, and so on until the cutter has removed a layer of requisite thickness from each flank on each of the teeth 101–104. It will be readily understood that the depth of grooves 26, 27 and 26a has been exaggerated for the sake of clarity and that, in actual operation, the thickness of shavings is minimal so that the workpiece and the cutter might have to perform many revolutions before the shaving operation is completed.

The relationship between the number of teeth on the workpiece and the number of teeth on the cutter must be selected in such a way that the number of teeth in any given group of teeth on the cutter is a whole mutilple (including one) of the number of teeth on the workpiece. Thus, if the workpiece has $n$ teeth, the number of teeth in each group of teeth on the cutter must be $m \cdot n$ wherein $m$ is a whole number (1, 2, 3 . . .).

In the embodiment of FIGS. 3 and 4, the flanks of the tooth 101 are treated consecutively by the cutting edges 115, 116, 117 of teeth 111, 121, 131; the flanks of the tooth 102 are treated consecutively by the cutting edges 115, 116, 117 of the teeth 112, 122, 132, and so on. Thus, each tooth of the workpiece is treated by a given tooth in each group of teeth on the cutter.

The lines 24, 25, 26 respectively indicate the common planes of cutting edges 115, 116, 117, and it will be noted that the distance $t_s$ equals the distance between a pair of adjacent planes 23, 24 or 24, 25 or 23, 25. The movements of the cutter 11A in the axial direction of the workpiece 10A should be of such magnitude that a cutting edge 115 will be capable of forming a groove 26 or 26a having a width $t_s$ and that the cutting edges 116, 117 will be capable of forming grooves of similar width, i.e., a width corresponding to the shortest distance between the projections of cutting edges 115, 116 or 116, 117 or 115, 117 with a plane passing through the axis of the cutter 11A. Thus, each flank of the workpiece is shaved in its entirety when the cutter completes a full revolution.

In FIG. 3, the cutting edges 115, 116, 117 form helices whose lead equals the shortest distance between a pair of adjacent cutting edges 115, 116 or 117 on the flank of any given tooth of the cutter 11A. It will also be noted that the teeth 111–114 of the group 20 are arranged consecutively, as seen in the circumferential direction of the cutter, and the same applies for the teeth 121–124 and 131–134 of the groups 21, 22. In other words, the groups themselves are arranged consecutively in the circumferential direction of the cutter.

FIG. 5 illustrates a shaving cutter 11B whose teeth 211–214, 221–224, 231–234 and 241–244 form four groups 30, 31, 32, 33. The workpiece 10B, shown in FIG. 6, has four teeth 201–204, i.e., the number of teeth in each group is again a whole multiple of the number of teeth on the workpiece. The tooth 201 is shaved by the cutting edges 215, 216, 217, 218 of teeth 211, 221, 231, 241; the tooth 202 is shaved by the cutting edges 215, 216, 217, 218 of teeth 212, 222, 232, 242, and so forth which means that each tooth of the workpiece is shaved by a specific tooth of each group. The lines 34, 35, 36, 37 respectively indicate the common planes of cutting edges 215, 216, 217 and 218.

In FIG. 5, the distance between the planes 34, 35 is greater than the distance between the planes 35, 36 or 35, 37 or 36, 37 or 34, 36 or 34, 37. Thus, the sequence in which the shavings are removed from the flanks of teeth 201–204 is different from the sequence described in connection with FIG. 4, and this is shown in FIG. 6.

The cutting edges 215 will form grooves 38; the cutting edges 216 will form grooves 39 (located to the left of and merging into the grooves 38); the cutting edges 217 will form grooves 40 to the right of and merging with the grooves 38; and the cutting edges 218 will remove the ribs 41 between the grooves 39, 40 so that each flank of all of the teeth 201–204 is fully shaved after one full revolution of the cutter 11B which corresponds to four revolutions of the workpiece 10B.

A comparison of FIGS. 3 and 4 with FIGS. 5 and 6 reveals that a workpiece with say four teeth 101–104 or 201–204 may be shaved with different types of cutters as long as the number of its teeth, multiplied by a whole number, equals the number of teeth in one of the groups 20–22 or 30–33. A set of four cutting edges 215, 216, 217, 218 must shave a certain zone of a tooth flank on the workpiece whose axial length $T_s$ equals the shortest distance between two adjacent cutting edges 215, 216, 217 or 218.

As explained hereinabove, the cutter 11B differentiates from the cutter 11A not only in the number of groups but also in the manner (sequence) in which the cutting edges remove shavings from the workpiece. In FIG. 4, the cutting edges 115, 116, 117 remove shavings consecutively so that the second set of shavings removed by the cutting edges 116 is removed at one side of the shavings removed by the cutting edges 115, and the cutting edges 117 remove shavings from zones adjacent to the zones which were treated by the cutting edges 116. In FIG. 6, the cutting edges 216, 217 respectively remove shavings at the opposite sides of the zones which were treated by the cutting edges 215, and the cutting edges 218 remove shavings from between the zones which were treated by the cutting edges 216, 217.

FIG. 7 shows another shaving cutter 11C whose teeth 311–314, 321–324, 331–334 and 341–344 are arranged in four groups and wherein the number of teeth in each group is a whole multiple of the number of teeth 301–304 on a workpiece, 10C which is shown in FIG. 8. It will be noted that the groups are not arranged consecutively, as seen in the circumferential direction of the cutter 11C, but an examination of FIGS. 7 and 8 will reveal that each tooth of the workpiece is shaved by at least one given tooth of each group. Thus, the tooth 301 will be shaved by teeth 311, 342, 333, 324; the tooth 302 will be shaved by teeth 321, 312, 343, 334; the tooth 303 will be shaved by teeth 331, 322, 313, 344; and the tooth 304 will be shaved by teeth 341, 332, 323, 314.

Each pair of teeth belonging to a given group is separated by four teeth belonging to other groups, e.g., the teeth 311, 312 of the first group are separated by teeth 321, 331, 341, 342. The cutting edges of the teeth on the cutter 11C form helices with a lead S which are interrupted after each series of four consecutive teeth; thus, the cutting edges of the fourth tooth 341 are coplanar with the cutting edges of the fifth tooth 342, the cutting edges of the eighth tool 332 are coplanar with the cutting edges of the ninth tooth 333, and so on. The lead S equals the distance between two adjacent cutting edges on any given flank and is a multiple of the axial distance between the cutting edges on two consecutive teeth whose cutting edges form a helix.

The cutting edges of the cutter 11C remove shavings in such a way that the resulting grooves form helices which are shown in FIG. 8. The teeth 311, 321, 331, 341 will form a first series of helically arranged grooves 50 during the first revolution of the workpiece 10C; the teeth 342, 312, 322, 332 will form a second series of helically arranged grooves 51 located to the left of the grooves 50 during the second revolution of the workpiece; the teeth 333, 343, 313, 323 will form a third series of grooves 52 located to the left of the grooves 51 during the third revolution of the workpiece; and the teeth 324, 334, 344, 314 will remove the ribs 53 between the grooves 50, 52 while the workpiece performs a fourth revolution. Thus, the cutting edges will shave each flank of the teeth 301–304 from the one to the other axial end of the workpiece 10C while the cutter 11C completes one full revolution or while the workpiece completes a number of revolutions which equals the number of groups provided that the number of teeth in each group is the same as the number of teeth on the workpiece.

The distribution of groups and/or of serrated teeth depends mainly on the sequence which form such groups depends mainly on the sequence in which the cutter should remove shavings from the tooth flanks of a workpiece. As stated hereinabove, the number of teeth in a group need not equal the number of teeth on the workpiece, as long as the number of teeth in a group is divisible without a rest by the overall number of teeth on the workpiece. Also, it is not necessary that the cutting edges on a given tooth flank of the cutter be equidistant from each other.

It should further be noted that the improved cutter may be used for treatment of workpieces with a large number of teeth. The drawings show comparatively single workpieces 10A, 10B, 10C with a very small number of teeth, but this was done exclusively for the sake of simplicity and clarity since the shaving action of the cutter is exactly the same if the workpiece has a very large number of teeth. For example, a workpiece with twenty-four teeth may be shaved, ground, burnished or similarly treated by a cutter having at least two (preferably at least three) groups of teeth and wherein each group comprises twenty-four, forty-eight or a higher multiple of twenty-four teeth. Good results can be achieved if a workpiece having twenty-four teeth is shaved with a cutter having ninety-six teeth arranged in four groups.

A very important advantage of the improved cutter is that it may be used for treatment of many types of workpieces, i.e., that a single cutter with a comparatively large number of serrated teeth may be used for shaving, burnishing or grinding of workpieces having different numbers of teeth as long as the number of teeth is properly related to the number of teeth in each group of teeth on the cutter.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A rotary cutter for treatment of toothed workpieces, comprising teeth arranged in a plurality of groups in each of which the number of teeth is a whole multiple of the number of teeth on the workpiece to be treated, each tooth having flanks provided with cutting edges extending in a direction substantially from the roots to the lands thereof and the cutting edges of teeth in each group being disposed in common planes but being staggered with reference to the cutting edges of teeth in each other group.

2. A rotary cutter for shaving of toothed workpieces by the crossed axes method, comprising teeth arranged in a plurality of groups in each of which the number of teeth is a whole multiple of the number of teeth on the workpiece to be treated, each tooth having flanks provided with cutting edges disposed in plane perpendicular to the axis of the cutter and the cutting edges of teeth in each group being disposed in common planes but being staggered in the axial direction of the cutter with reference to the cutting edges of teeth in each other group.

3. A rotary cutter for treatment of toothed workpieces, comprising teeth arranged in a plurality of groups in each of which the number of teeth equals the number of teeth on the workpiece to be treated, each tooth having flanks provided with cutting edges extending in a direction substantially from the roots to the lands thereof and the cutting edges of teeth in each group being disposed in common planes but being staggered with reference to the cutting edges of teeth in each other group.

4. A rotary cutter for treatment of toothed workpieces, comprising teeth arranged in at least three groups in each of which the number of teeth is a whole multiple of the number of teeth on the workpiece to be treated, each tooth having flanks provided with cutting edges extending in a direction substantially from the roots to the lands thereof and the cutting edges of teeth in each group being disposed in common planes but being staggered with reference to the cutting edges of teeth in each other group.

5. A rotary cutter for shaving of toothed workpieces by the crossed axes method, comprising teeth arranged in a plurality of groups in each of which the number of teeth is a whole multiple of the number of teeth on the workpiece to be treated, each tooth having flanks provided with cutting edges disposed in planes perpendicular to the axis of the cutter and the cutting edges of teeth in each group being disposed in common planes but being staggered in the axial direction of the cutter with reference to the cutting edges of teeth in each other group, the teeth of each group being arranged consecutively as seen in the circumferential direction of the cutter.

6. A rotary cutter for shaving of toothed workpieces by the crossed axes method, comprising teeth arranged in a plurality of groups in each of which the number of teeth is a whole multiple of the number of teeth on the workpiece to be treated so that each tooth of the workpiece is treated by at least one tooth of each group when the cutter is caused to rotate while its teeth mesh with the teeth of the workpiece, each tooth having flanks provided with cutting edges disposed in planes perpendicular to the axis of the cutter and the cutting edges of teeth in each group being disposed in common planes but being staggered in the axial direction of the cutter with reference to the cutting edges of teeth in each other group.

7. A rotary cutter for treatment of toothed workpieces, comprising teeth arranged in at least three groups in each of which the number of teeth is a whole multiple of the number of teeth on the workpiece to be treated, each tooth having flanks provided with cutting edges disposed in planes perpendicular to the axis of the cutter and the cutting edges of teeth in each group being disposed in common planes but being staggered with reference to the cutting edges of each other group, each cutting edge of any given group forming a helix with a cuttting edge of each other group.

8. A rotary cutter as set forth in claim 7, wherein the teeth of said groups are arranged in such a way that two adjacent teeth of any given group are separated by a number of teeth belonging to the other groups which is a whole multiple of the total number of said groups.

9. A rotary cutter as set forth in claim 7, wherein said helices are formed by the cutting edges on consecutive teeth as seen in the circumferential direction of the cutter and wherein the lead of a helix formed by the cutting edges on a number of teeth which equals the number of teeth on the workpiece to be treated is a whole multiple of the distance between a pair of adjacent cutting edges in any given tooth of the cutter.

10. A rotary cutter as set forth in claim 9, wherein the lead of said helices equals the distance between a pair of adjacent cutting edges on any given tooth of the cutter.

11. A rotary cutter for treatment of toothed workpieces, comprising teeth arranged in a plurality of groups in each of which the number of teeth is a whole multiple of the number of teeth on the workpiece to be treated, each tooth having two flanks each provided with cutting edges extending in a direction substantially from the roots to the lands thereof and the cutting edges of teeth in each group being disposed in common planes but being staggered with reference to the cutting edges of teeth in each other group.

12. A rotary cutter as set forth in claim 11, wherein the combined number of teeth in said groups exceeds at least three times the number of teeth on the workpiece to be treated and wherein the cutting edges in each of said flanks are equidistant from each other.

13. A rotary cutter for shaving by the cross axes method as set forth in claim 12, wherein the number of teeth in each of said groups equals the number of teeth on the workpiece to be treated and wherein said cutter resembles a spur gear.

14. A rotary cutter for shaving of toothed workpieces by the crossed axes method, comprising teeth arranged in at least three groups in each of which the number of teeth equals the number of teeth on the workpiece to be treated, each tooth having flanks provided with equidistant cutting edges disposed in planes perpendicular to the axis of the cutter and the cutting edges of teeth in each group being disposed in common planes but being staggered in the axial direction of the cutter with reference to the cutting edges of teeth in each other group.

15. A rotary cutter for treatment of toothed workpieces, comprising teeth arranged in a plurality of groups in each of which the number of teeth is a whole multiple of the number of teeth on the workpiece to be treated, each tooth having flanks provided with cutting edges extending in a direction substantially from the roots to the lands thereof and the cutting edges of teeth in each group being staggered with reference to the cutting edges of teeth in each other group.

16. A rotary cutter for treatment of toothed workpieces, comprising teeth arranged in a plurality of groups in each of which the number of teeth is a whole multiple of the number of teeth on the workpiece to be treated so that each tooth of the workpiece is treated by at least one given tooth of each group, each tooth having flanks provided with cutting edges extending in a direction substantially from the roots to the lands thereof and the cutting edges of teeth in each group being disposed in common planes but being staggered with reference to the cutting edges of teeth in each other group.

No references cited.

WILLIAM W. DYER, JR., *Primary Examiner.*